Sept. 12, 1939.  F. O. SNOW, JR  2,172,627
RAIL CLAMPING MECHANISM
Filed March 29, 1939  7 Sheets-Sheet 2

Fig. 2.

Inventor:
Frederick Orren Snow, Jr.
by his Attorney
John P. Nolan

Sept. 12, 1939.　　　　F. O. SNOW, JR　　　　2,172,627
RAIL CLAMPING MECHANISM
Filed March 29, 1939　　　7 Sheets-Sheet 3

Inventor
Frederick Orren Snow, Jr.
by his Attorney
John B. Nolan

Sept. 12, 1939.   F. O. SNOW, JR   2,172,627
RAIL CLAMPING MECHANISM
Filed March 29, 1939   7 Sheets-Sheet 4

Inventor:
Frederick Orren Snow Jr.
by his Attorney
John R. Nolan

Patented Sept. 12, 1939

2,172,627

UNITED STATES PATENT OFFICE 2,172,627

RAIL CLAMPING MECHANISM

Frederick Orren Snow, Jr., Maplewood, N. J., assignor to Robins Conveying Belt Company, Passaic, N. J., a corporation of New Jersey Application March 29, 1939, Serial No. 264,743

13 Claims. (Cl. 188—43)

This invention relates to rail-clamping mechanism for conveying bridges, travelling cranes and analogous structures, having reference more especially to improvements in the mechanism disclosed in Letters Patent of the United States No. 1,644,942, dated October 11, 1927.

The object of the invention is to provide novel and efficient power and motion transmitting devices for operating the clamping jaws in respect to the rails, whereby a rapid and effective gripping of rails of various sizes can be accomplished.

To this end my invention embodies features of construction and combinations of parts which in practical forms will be hereinafter described and the scope of the invention then expressed in the appended claims.

In the embodiment of my invention illustrated in Figs. 1 to 8, inclusive, the mechanism comprises two pairs of complementary clamps which are respectively arranged in co-operative relation to the heads of two parallel rails. As both sets of clamps and their appurtenances are the same in construction and operation, save as to their reversed positions in relation to the respective rails, a description of one set of clamps and the operating elements therefor will suffice, except as to means, which will be hereinafter described, for connecting and correspondingly actuating the plural sets.

Each pair of clamps is constituted by a lever 10 and a head 11, the lever having near its lower portion lugs 12 pivotally connected, as at 13, in and between lugs 14 which are integral with and extended outwardly from the head in a plane directly above the adjacent rail. The associated lever and head are supported by a roll 15 which is mounted on a suitably disposed stud 16 on the head so as to run on the adjacent rail 17.

The lower arm of the lever terminates in an inwardly curved jaw portion 18 which, by actuation of the upper arm of the lever, is moved against and from the proximate rail. The face of the jaw has therein a rounded socket 19 in which is rockably seated a shoe 20 having at its ends ears 21 which are pivoted to the respective ends of the jaw. This shoe by virtue of its rocking capacity is self-aligning to the sides of the rail head and is therefore effective to grip tapered rail heads.

The head 11 is supported at its upper portion, as at 22, by and between a pair of parallel links 23, which, in the present instance, pivotally connect such head with the corresponding head of the other pair of jaw members. The lower end of each head 11 is equipped with a removable shoe 24 which abuts the inner side of the adjacent rail substantially as shown and described in Patent No. 1,644,942; that is to say, the shoe 24 is provided with a bearing surface 25 suitably inclined with reference to the rail, with which surface co-acts the concentric face of a rocker 26 pivotally mounted, as at 27, within a recess 28 in the lower portion of the head. The rocker is maintained normally in central position by the opposed actions of suitably arranged springs 29, thus causing clamping pressure of the shoe 24 against the rail by the rocker in either direction of movement from its central position during the contact of the shoe with the rail. When the shoe 24 is against the rail the head 11 occupies a definite position, while the associated lever 10 with its shoe is movable to and fro on the fulcrum 13 in order to clamp or unclamp the rail.

The lever 10 and the complementary head 11 are resiliently connected by a rod 30 and compression springs 31. The rod extends freely through openings 35 in the curved ends of sockets 33 and 34 formed in the lever and head, respectively, and is provided with washers 32 which bear against the curved ends of the sockets. One end of the rod has a fixed head 340 and the other an adjustable head 330. The springs 31, being interposed between the heads and the respective washers 32, conjointly urge the lever 10 to unclamping position while the opposing shoe 24 of the head 11 is seated against the rail.

According to my invention simple and efficient mechanism is provided whereby a variable throw can be given to the lever 10 in order to adapt its clamping jaw to rails of varying size and to exert an effective clamping force irrespective of the size of the rail. Such mechanism, in the double rail form illustrated, is as follows: Pivoted in and between lugs 36 on the lever 10, adjacent its fulcrum 13, is the lower end of an upstanding arm 37 having in its midportion an opening through which the rod 30 freely extends. This arm rises adjacent the upper end of the lever, and is jointed by means of a toggle member 38 with the lower ends of a pair of spaced parallel arms 39, which latter, in conjunction with a rockable cam member 40 pivotally mounted therebetween, constitute the complementary member of the toggle. Setscrews 41 adjustably mounted in the upper end of the lever 10 bear against the opposing end of the toggle member 38. The upper ends of the arms 39 are provided with trunnions 42 having flattened outer end extensions 43. The extensions are slidably fitted in vertical guide slots 44 in the side walls 45 of a housing which is supported by the depending frame structure 46 of the usual travelling carriage. The curved cam face of the member 40 is of progressively increasing throw, so as to provide, in effect, a succession of toggle arms of gradually increasing length from one end to the other of the cam face, which face is preferably toothed or serrated, as at 47. The ends of the pivot shaft 48 for the cam member extend beyond the respective arms 39 and are provided with rolls 49 adapted to run in horizontal guideways 50 on the inner surfaces of the walls 45 of the housing, thus affording guide means for horizontal movement of the shaft 48 and also compensatory swinging and sliding motion of the toggle members 39 and 38, as determined by the rotative movement of the cam. The peripheral teeth of the cam 40 mesh with similar teeth 51 on the adjacent face of a vertically movable bar 52 which freely extends into the housing. Hence by the act of forcibly depressing the bar 52 the cam is partially turned in a clockwise direction and its axis perforce gradually moved horizontally outward from vertical alignment with the upper axis of the toggle member 39, thereby progressively advancing the lower ends of the latter and exerting on the toggle a straightening action effective to swing out the upper end of the lever 10 against the action of the springs 31, and cause the lower clamp shoe 20 to abut and clamp the opposing side of the rail head.

Figure 1:
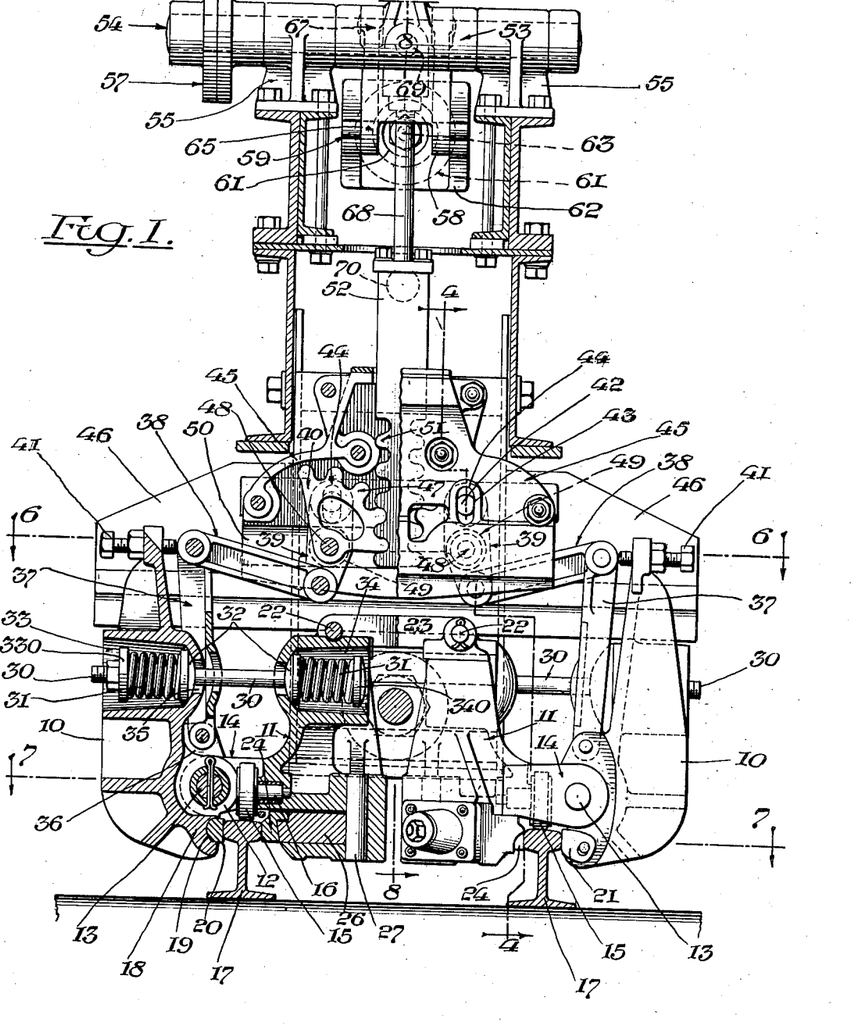
Figure 1 is a side elevation, partly in section, of a form of rail clamping mechanism embodying the principle of my invention, the respective elements being shown in their relative positions when a pair of spaced rails are clamped.
Figure 2:
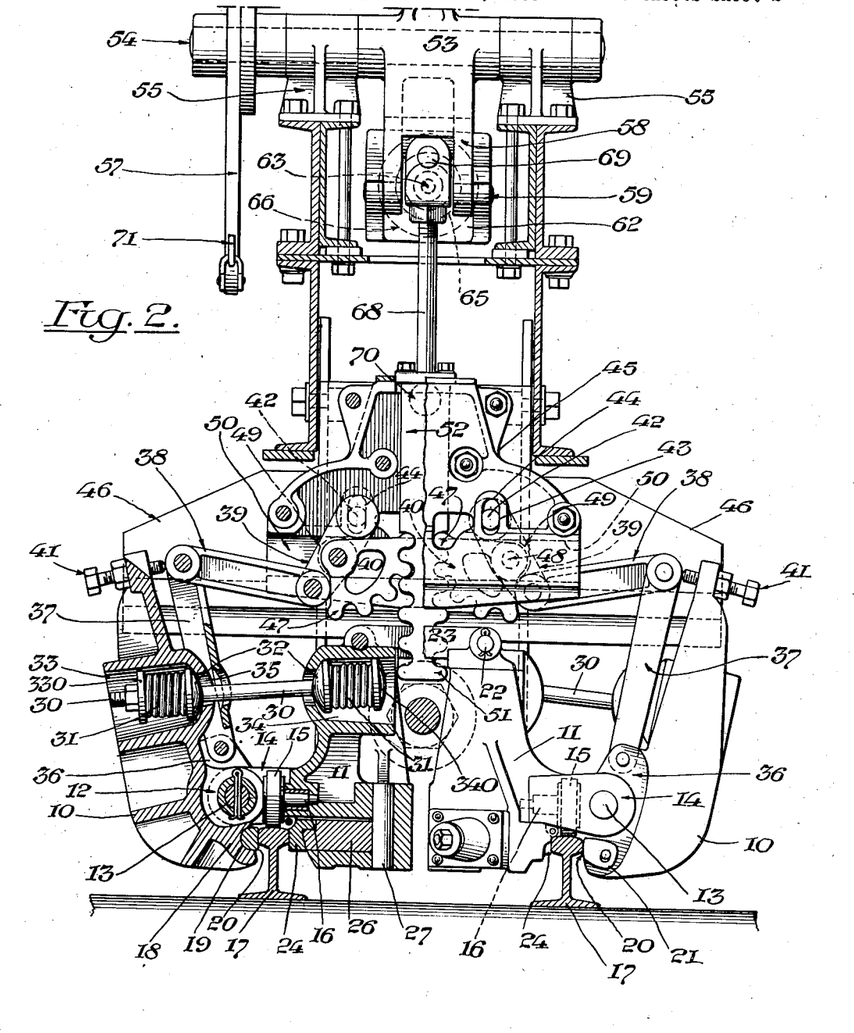
Fig. 2 is a similar view showing the relation of the elements when smaller rails are clamped.

In the case of relatively large or heavy rails a slight displacement of the toggle 38, 39 effects the clamping action, as seen in Fig. 1, whereas with smaller rails the displacement of the toggle is proportionately amplified by virtue of the progressive action of the rack teeth on the cam teeth of greater throw, as seen in Fig. 2; it being obvious that all sizes of rails between those indicated will be similarly clamped by the agency of the mechanism described. To unclamp the rail the bar 52 is raised and the cam 40 is therefore reversely moved, that is counterclockwise, to swing the toggle inward, as seen in Fig. 3.

Where two sets of clamping elements are respectively arranged in co-operative relation to the heads of two parallel rails, the actuating bar 52 is provided on opposite sides with similar rack teeth 51 which mesh with the teeth of the respective cam members 40. Consequently in the operation of the unitary bar 52 the two cams are simultaneously and uniformly operated and as a result both levers 10 are similarly actuated to accomplish the requisite clamping and unclamping of the respective rails.

The means for operating the toggle actuating bar 52 to cause the clamping or the unclamping of the rails, as desired, is or may be generally similar to the toggle operating means disclosed in Patent No. 1,644,942. The means herein shown comprises a rocker 53 fast on a shaft 54 having its bearings in brackets 55 mounted within a suitably disposed housing 56 on the frame structure, which shaft is provided at one end with an operating arm 57. The rocker has a bifurcated member constituting two arms 58 which are jointed, as at 59, to the adjacent end of a spring expanded link member whereof the opposite end is pivoted on a fixture within the housing 56. The expansible member and the rocker member constitute a toggle which, by actuation of the operating arm 57, can be moved to throw the toggle joint 59 downward. The expansible member comprises a tubular head 61 having a bifurcated end portion 62 to which the rocker member 58 is jointed. This head is slidably coupled by means of an axial rod 63 to a tubular head 64 which is pivotally supported at its outer end, as at 60. A stout spring 65, encircling the heads and abutting flanges 66 thereon, tends to urge the head 61 outward. The rocker 53 is also provided with a shorter arm 67 in angular relation to the toggle member 58, and the respective ends of a link 68 are connected by universal joints 69 and 70 to the arm 67 and the top of the actuating bar 52.

Figures 3, 4, 5:
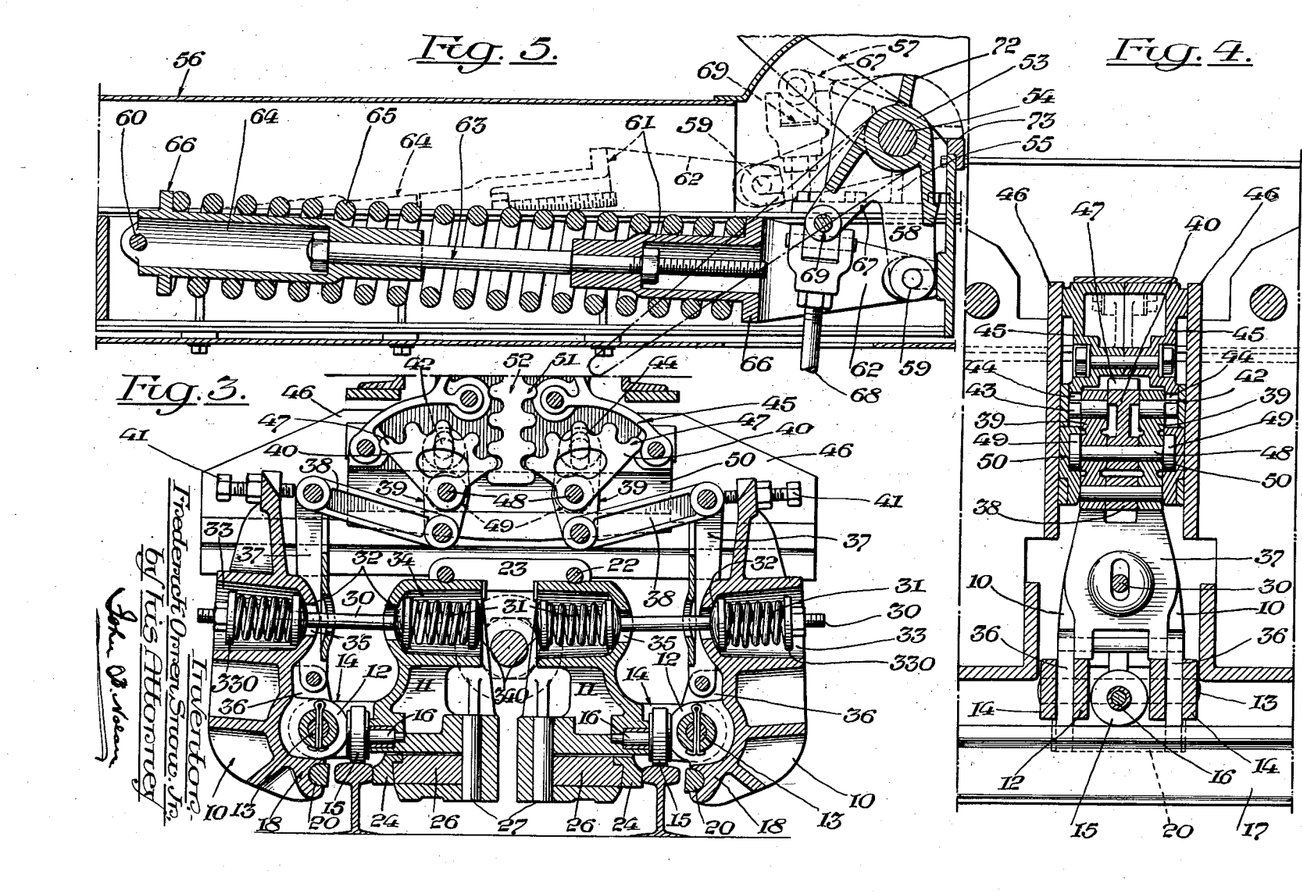
Fig. 3 is a longitudinal vertical section of the lower part of the mechanism shown in Fig. 1, illustrating the jaws in unclamping relation to the rails.
Fig. 4 is a transverse vertical section, as on the line 4—4 of Fig. 1.
Fig. 5 is a longitudinal vertical section of a toggle comprising an expansion link and rocker mechanism for operating the clamping elements and locking them in clamping relation, said mechanism when in fully released position being indicated by dotted lines.
Figure 6:
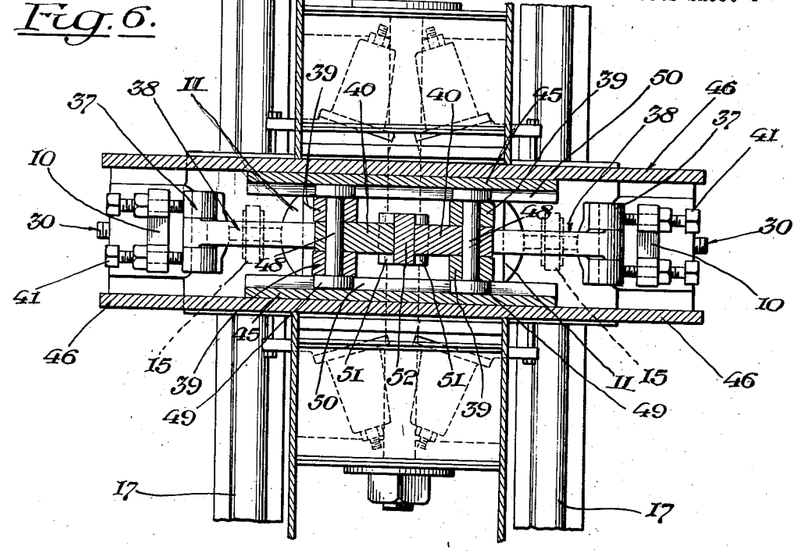
Figs. 6 and 7 are horizontal sections, as on the lines 6—6 and 7—7, respectively, of Fig. 1.
Figure 7:
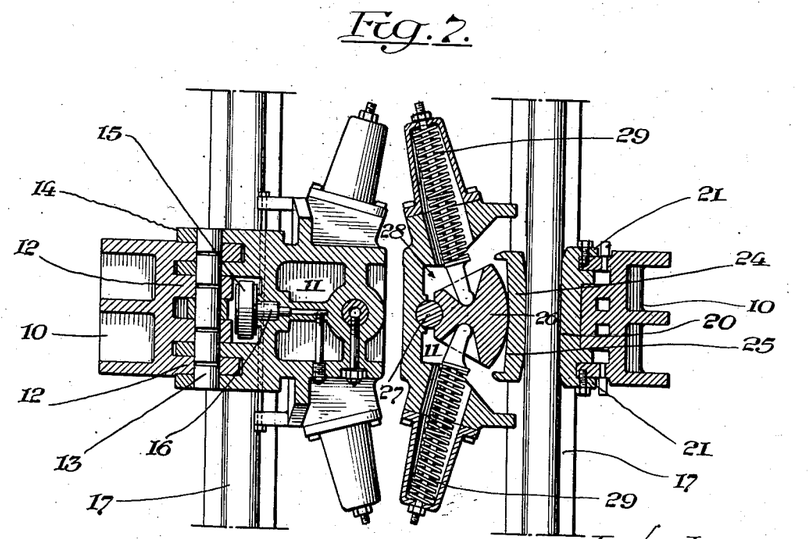
Figure 8:
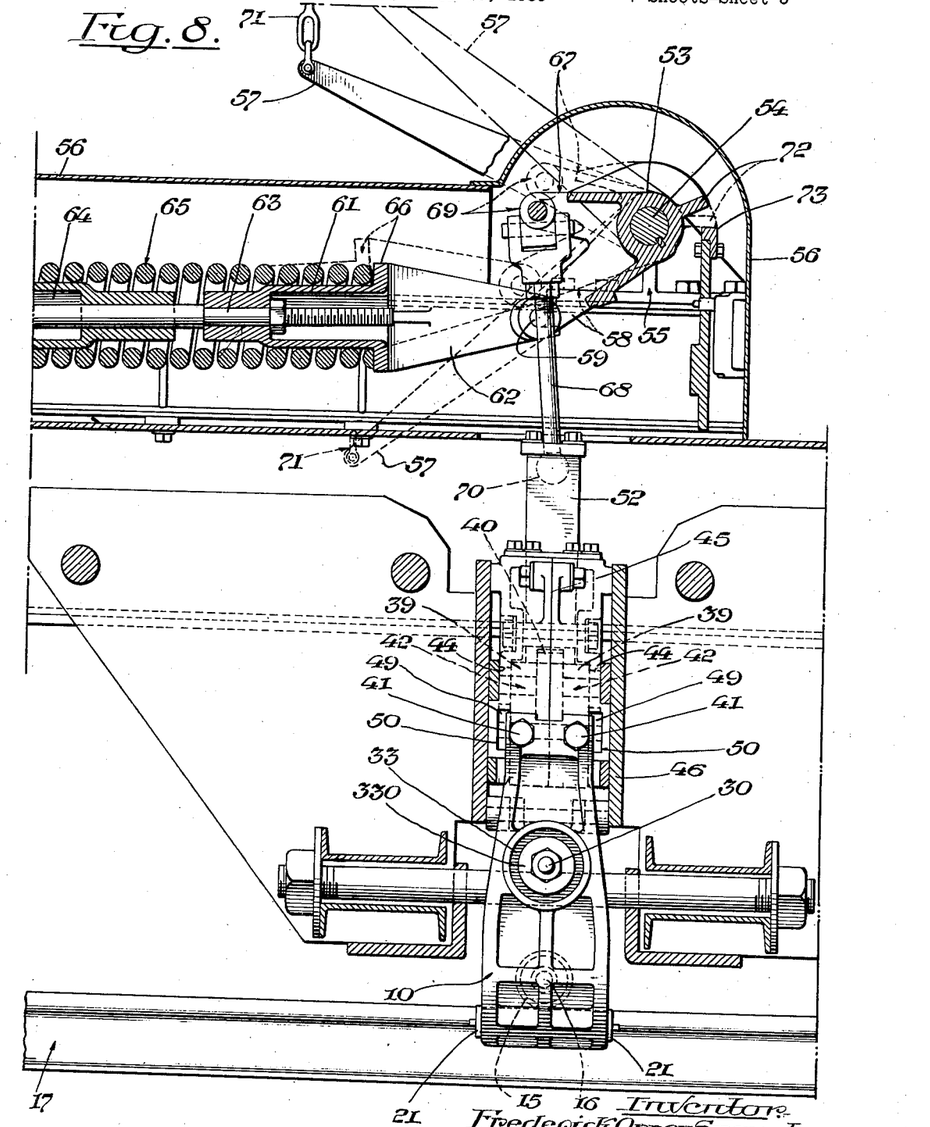
Fig. 8 is a transverse vertical section, as on the line 8—8 of Fig. 1.

The spaced and radial relations of the joints 59 and 69 to the axis of the rocker 53 are such that when the operating arm 57 is pulled to its uppermost position indicated by the dotted lines in Figs. 5 and 8, the rack bar 52 is fully raised with its teeth in mesh with the teeth or tooth at the lower or smaller end of the cam 40 (as seen in Fig. 3), which arm is held in its determined position by the usual operating rod or link connection 71 for the arm. A radial projection 72 on the rocker 53 abuts a suitably-disposed fixture 73 which serves as a limiting stop when the operating arm 57 is in its uppermost or releasing position. When the pull on the arm 39 is released the expansion of the spring-actuated toggle member effects, by its pivotal connection with the rocker arm 58, the partial turning, counterclockwise, of the rocker 53, thereby through the pivotal connection of the rocker arm 67 with the depending link 68, forcing down the actuating bar 52. This bar in its descent partially turns the cam clockwise, and by virtue of the eccentricity of the latter coincidentally moves it outwardly, thereby progressively actuating the toggle members 38, 39 and forcing outwardly the upper arm of the opposing jaw lever 10 until the shoe 20 abuts and grips the opposing rail head, as in Figs. 1 or 2.

In the case of a relatively large rail, such as shown in Fig. 1, the operating arm 57 occupies the position seen in Fig. 8, wherein the shoe 20 grips the rail, and in the case of a smaller rail, such as shown in Fig. 2, the operating arm occupies the position indicated in Fig. 5 when the rail is gripped. In any case the actuating bar 52 is in mesh with the teeth of the cam 40 and an effective gripping of the rail is caused and maintained by the expansive force of the spring 65 until the operating arm 57 be again pulled to its uppermost releasing position. The described gripping operation of the clamping mechanism is equally effective when the mechanism is applied to rails of various sizes between those referred to.

Figure 9:
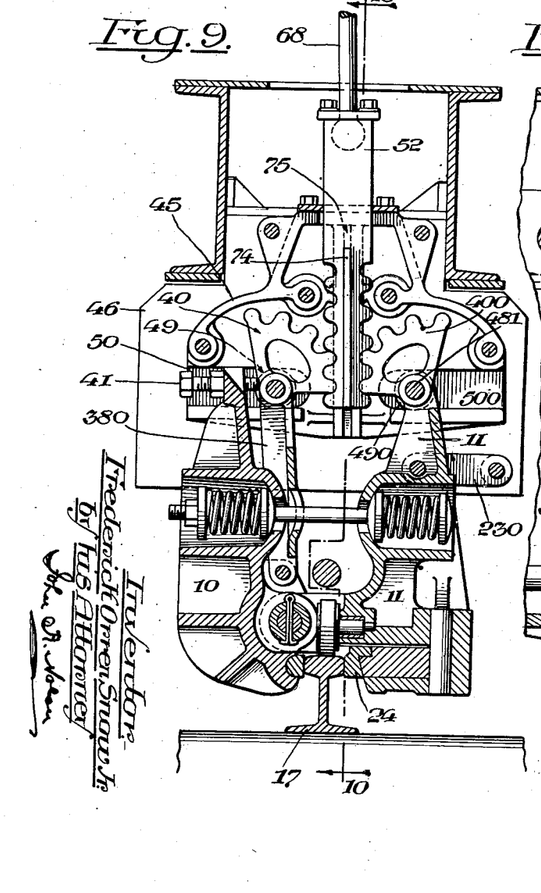
Fig. 9 is a longitudinal vertical section of a modified form of clamping mechanism as applied to a single rail.
Figure 10:
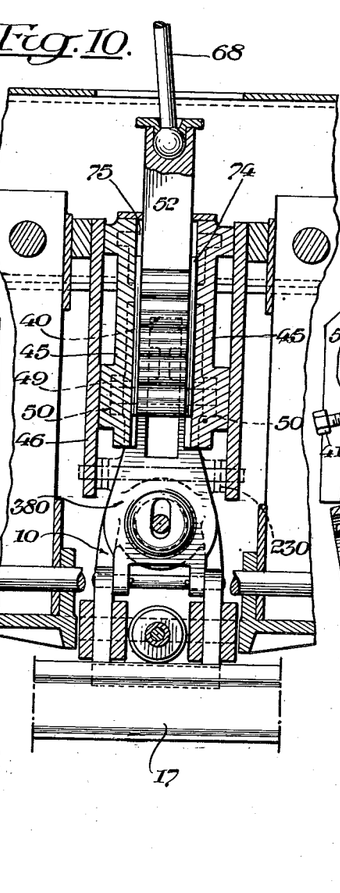
Fig. 10 is a transverse vertical section, as on the line 10—10 of Fig. 9.
Figure 11:
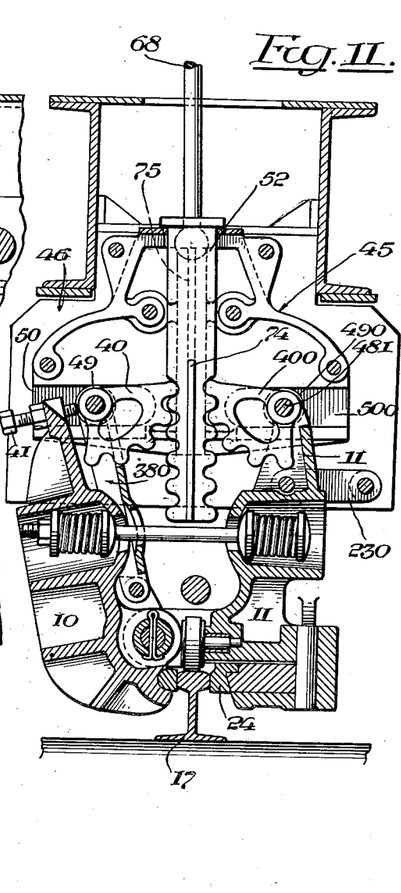
Fig. 11 is a view similar to Fig. 9 showing the modified mechanism as applied to a smaller rail.

In Figs. 9, 10 and 11 of the drawings, is illustrated a modified form of clamping mechanism as applied to a single rail 17. In this construction the head 11 is pivotally connected to the frame structure by means of a link 230, and the upper end of the head has pivotally mounted thereon a toothed cam 400 in mesh with the opposing teeth of the vertically-movable actuating bar 52. The ends of the pivot pin 481 for this cam are equipped with rolls 490 which run in horizontal guideways 500 in the walls 45 of the housing structure.

The variable throw toggle for acting directly on the jaw lever 10 comprises an arm 380, which, similarly to the supporting link 37 previously described, is pivotally mounted at its lower end on the lever 10, the upper end of the arm 380 being likewise arranged in abutting relation to the upper part of the jaw lever. The other arm of the toggle is constituted by the toothed cam 40 which corresponds with but is disposed in reverse relation to the cam 400. The teeth of the cam 40 mesh with the opposing teeth of the rack bar 52 and its pivot connection with the arm 380 is equipped with rolls 49 that run in the horizontal guide-ways 50 in the walls 45 of the housing. This housing is supported by and between the spaced walls of the frame structure 46 so as to have capacity for limited endwise sliding movement, and the rack bar 52 is provided with lateral longitudinally extending ribs 74 which are slidably fitted in vertical guideways 75 in the respective walls 45 of the housing.

When in the operation of the clamping mechanism just described the rack bar 52 is raised or lowered, as, for example, through the agency of the spring toggle devices hereinbefore described, the two cams 40 and 400 are reversely turned on their respective axes by the action of the coacting bar, the travel of the cams being away from each other when the bar is raised, and toward each other when the bar is lowered.

In case of a large rail when the bar is depressed a determined distance and the cams 40 and 400 are thereby simultaneously swung inward, the gradually increasing toothed surfaces of the respective cams are progressively engaged by the opposing faces of the rack, and in consequence the toggle constituted by the arm 380 and the cam 40 are actuated to force the abutting upper end of the jaw lever 10 outward until the positive clamping of the rail has been effected, as seen in Fig. 9. In the case of a smaller rail the rack bar 52 is depressed still farther thus swinging the toothed cams 40 and 400 toward each other, the progressive action of the bar on the gradually increasing cam surfaces opposed thereto forcing the axes of the cams outwardly along the respective guideways. When the shoe 24 on the head 11 abuts the rail the outward movement of the cam 400 is checked, while that of the cam 40, as well as the reverse turning motion of the respective cams, continues until the rail has been positively clamped, as seen in Fig. 11; it being noted that in this operation, owing to the larger movement of the jaw lever 10, the pendant rack bar 52 and the supporting structure therefor are forced slightly laterally from a central position by the action of the cam 400. Irrespective of the size of the rail within determined limits, when the bar 52 is raised to its highest position the characteristic cams 40 and 400 are turned in opposite outward directions, thus forcibly swinging the toggle arm 380 inward and permitting the jaw lever 10 to resume its open or unclamping condition.

Figures 12, 13, 15:
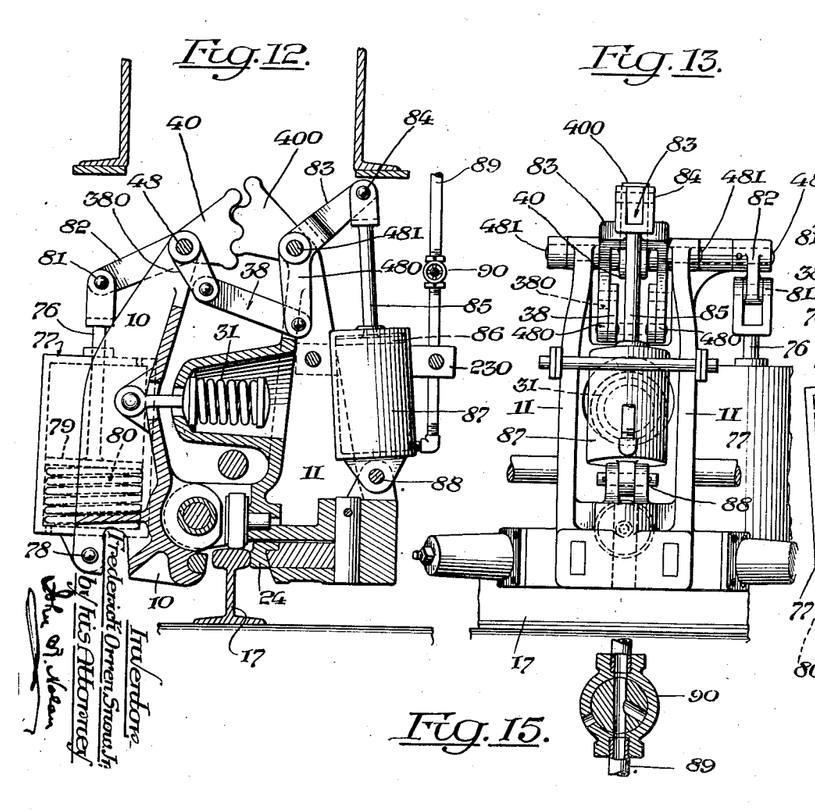
Fig. 12 is a longitudinal vertical section of another modification as applied to a single rail, the mechanism being unclamped from the rail.
Fig. 13 is an elevation of the clamping mechanism shown in Fig. 12.
Figs. 15 and 16 are sections of the air controlling valve used in the second modification, showing the valve in the relative positions which it occupies in Figs. 12 and 14, respectively.
Figures 14, 16:
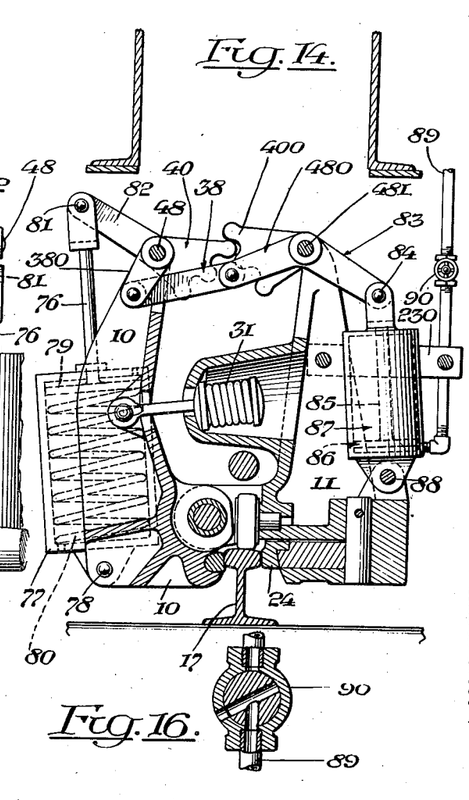
Fig. 14 is a view similar to Fig. 12, showing the mechanism as clamped to the rail.

In Figs. 12, 13 and 14 is illustrated another modified form of clamping mechanism as applied to a single rail. In this construction a jaw lever 10 and a complementary jaw head 11 are employed, the upper arm of the lever being urged toward the head by a suitably disposed spring 31. Two rockable cam members 40 and 400 having intermeshing toothed faces are pivotally supported at the upper ends of the lever 10 and head 11 respectively; the cam 40 being fixed to its pivot stud 48 and the cam 400 being loose on its pivot stud 481. The toothed face of each cam is of progressively increasing throw, one cam being disposed reversely of the other as shown in order that when the cam on the jaw lever is moved about its axis in one direction the cam on the jaw head is moved in the opposite direction, thus effecting a clamping or unclamping swinging motion of the jaw lever in respect to the rail 17, depending upon the direction of movement of the cam 40.

Fast on the respective pivot studs 48 and 481 are depending bifurcated arms 380 and 480 which are pivotally connected by an arm 38, the whole constituting a toggle element. By actuation of the cam 40 in a clockwise direction the jointed arms 38 and 480 are moved toward and near a "straightened" position, thus forcing outward the upper arm of the jaw lever 10 against the action of the spring 31 and thereby ensuring the gripping of the rail by the shoe at the foot of the lever, as seen in Fig. 14. The effective throw of the lever depends upon the width of the rail head. When the cam 40 is moved in a counterclockwise direction the jointed arms are moved to depress the toggle knuckle, thus effecting a counterclockwise movement of the cam 400 and permitting the opening or rail-releasing movement of the jaw lever, as seen in Fig. 12.

The means herein shown for operating and controlling the cam 40 to effect the clamping or permitting the unclamping of the rail comprises a rod 76 which is slidably fitted in the top of a cylinder 77, whereof the base is pivotally supported, as at 78, on the lower portion of the jaw lever 10. The inner end of the rod 76 carries a head or piston 79 which is vertically movable within the cylinder, a stout spring 80, interposed between the head 79 and the bottom of the cylinder, urging the head 79 and its rod 76 upward.

The upper end of the rod is pivotally connected, as at 81, to an outwardly extending arm 82 fast on the pivot stud 48 to which the cam 40 is connected, thus maintaining the cam 40 in the down or unclamping position illustrated in Fig. 12. Fast on the pivot stud 481 supported by the jaw head 11 is an outwardly extending bifurcated arm 83 which is pivotally connected, as at 84, with the rod 85 of a piston 86 that is slidably fitted in a cylinder 87 constituting a pneumatic chamber. The base of this cylinder is pivoted, as at 88, on the lower portion of the jaw head 11. A supply pipe 89 for air under pressure leads into the interior of the cylinder 87. This pipe is equipped with a conventional valve 90 by manipulation of which the supply of air may be permitted to enter the chamber beneath the piston 86, or the air supply to the chamber may be checked while establishing communication between the chamber and the open air. When the valve is set to check the influx of air to the chamber and to open the chamber to the atmosphere, as seen in Fig. 16, the expansion of the spring 80 and consequently the gripping action of the jaw lever 10 through the toggle mechanism described, are effected, this condition being maintained until the valve is set as in Fig. 15 to permit the influx of air under pressure into the chamber. Thereupon the piston 86 is forced upward by the action of the confined air, and in consequence the toggle mechanism and connections are operated to cause the contraction of the spring 80 and the opening or unclamping of the jaw lever.

It will be seen that each of the exemplifying constructions hereinbefore described is characterized by the provision in rail clamping mechanism of a clamp operating toggle including an element having a rotative cam of gradually increasing throw by virtue of which the effective length of the element is progressively increased or reduced according to the direction of movement of the cam about its axis, thereby effecting the clamping or permitting the unclamping of rails of various sizes in connection with which the mechanism may be used.

It is to be understood that the invention is not limited to the particular exemplifying forms thereof herein disclosed, as the mechanism may be modified within the principle of the invention and the scope of the appended claims.

I claim—

1. In rail clamping mechanism, the combination of a rail clamp, an actuating toggle therefor arranged in co-operative relation to said clamp and including a rockable member having a cam face of progressively increasing throw, and means co-acting with said face to effect a progressive clamping movement of the toggle.

2. In rail clamping mechanism, the combination of a rail clamp, an actuating toggle therefor arranged in co-operative relation to said clamp and including a rockable member having a toothed cam of progressively increasing throw, and toothed means co-acting with said face to effect a progressive clamping movement of the toggle.

3. In rail clamping mechanism, the combination of a rail clamp, an actuating toggle therefor arranged in co-operative relation to said clamp and including a member having a cam face of progressively increasing throw, means co-acting with said face to effect a progressive clamping movement of the toggle, and means for supporting and guiding said toggle in its movement toward and from the clamp.

4. In rail clamping mechanism, the combination of a rail clamp, an actuating toggle therefor comprising a member arranged in co-operative relation to said clamp and including a toothed cam face of progressively increasing throw, a toothed element co-acting with said face to effect a progressive clamping movement of the toggle, and means for supporting and guiding said toggle in its movement toward and from the clamp.

5. In rail clamping mechanism, the combination of a rail clamp, a toggle arranged in co-operative relation to said clamp and embodying a plurality of jointed arms one of which includes a rockable member having a toothed cam face of progressively increasing throw, and means comprising a toothed element co-acting with said face to effect a progressive clamping movement of the toggle.

6. In rail clamping mechanism, the combination of a rail clamp, a toggle in co-operative relation to said clamp and embodying jointed arms, one of which has a shiftable pivot mounted in spaced relation to the joint of the arms and includes a rockable member having a cam face of progressively increasing throw, said arms movable in a path toward and from the rail clamp, means for supporting and guiding said arms in such path, and an actuating element for said cam face.

7. In rail clamping mechanism, the combination of a rail clamp, a toggle in co-operative relation to said clamp and embodying jointed arms, one of which has a shiftable pivot mounted in spaced relation to the joint of the arms and includes a rockable member having a toothed cam face of progressively increasing throw, said arms movable in a path toward and from the rail clamp, means for guiding said arms in such path, and an actuating element having teeth in mesh with the teeth of the cam face.

8. In rail clamping mechanism, the combination of a rail clamp comprising a jaw lever, a toggle, a link pivotally supporting one of the members of said toggle on and in co-operative relation to the lever, a shiftable pivot mounting for another member of the toggle, said mounting arranged in spaced relation to the knuckle of the toggle, and said other member including a pivoted cam movable therewith in a path toward and from the rail clamp and having a face of progressively increasing throw, means for guiding the toggle in its path, and an actuating element co-acting with the face of the cam.

9. Mechanism for clamping a structure to a pair of rails, comprising two pairs of opposed clamping jaws, one jaw of each pair constituted by a lever and the other jaw of each pair constituted by a head with which the said lever is pivotally connected, the respective heads being arranged between the rails, means connecting said heads, toggles for actuating the respective levers, the outer member of each toggle arranged in co-operative relation to the adjacent lever and the inner member pivotally supported and including cams mounted in opposite relation on the respective inner members, and a unitary actuating element co-acting with the respective cams to effect the simultaneous clamping or unclamping action of the toggles.

10. Mechanism for clamping a structure to a pair of rails, comprising two pairs of opposed clamping jaws for the respective rails, one jaw of each pair constituted by a lever and the other jaw of each pair constituted by a head with which the said lever is pivotally connected, the respective heads being arranged between the rails, means connecting said heads, toggles for actuating the respective levers, the outer member of each toggle arranged in co-operative relation to the adjacent lever and the inner member having a shiftable pivot mounting in spaced relation to the joint of the members, two oppositely disposed toothed cams pivotally mounted on the respective inner members and simultaneously movable in paths toward or from the respective levers, as desired, means for guiding the said inner members and their cams in the respective paths, and an actuating element having oppositely disposed teeth in mesh with the teeth of the respective cams.

11. In rail clamping mechanism, the combination with a jaw lever and a complementary jaw head, of a toggle including two jointed members having their knuckle in co-operative relation to said jaw lever, one of said members being pivoted to the lever and the other member having a toothed cam face of progressively increasing throw, a member pivoted to the jaw head and having a counterpart toothed cam face reversely disposed in relation to the first named cam face, and a reciprocative actuating rack having oppositely disposed teeth in mesh with the teeth of the respective cam faces.

12. In rail clamping mechanism, the combination with a jaw lever and a complementary jaw head, of a toggle including two jointed members having their knuckle in co-operative relation to said jaw lever, one of said members being pivoted to the lever and the other member having a toothed cam face of progressively increasing throw, a member pivoted to the jaw head and having a counterpart toothed cam face reversely disposed in relation to the first named cam face, a reciprocative actuating rack having oppositely disposed teeth in mesh with the teeth of the respective cam faces, and a laterally movable supporting structure through which the rack freely extends, said structure having guide means for the axes of the respective cam faced members.

13. In rail clamping mechanism, the combination of a jaw lever and a complementary jaw head, a toggle comprising arms pivoted on said lever and head respectively, a member pivotally connecting said arms, and a cam connected with the arm carried by said jaw lever and having a toothed face of progressively increasing throw, a similar cam pivotally mounted on the said jaw head in opposite relation to and in mesh with the teeth of the first named cam, means associated with the jaw lever for actuating the first named cam to maintain said lever in clamping position, and means associated with the jaw head for controlling the operation of said actuating means.

FREDERICK ORREN SNOW, Jr.